United States Patent
Marcario

(10) Patent No.: US 9,466,227 B2
(45) Date of Patent: Oct. 11, 2016

(54) MULTIPLE MATHEMATICAL OPERATION TEACHING DEVICE

(71) Applicant: Domenico Marcario, Bartlett, NH (US)

(72) Inventor: Domenico Marcario, Bartlett, NH (US)

( * ) Notice: Subject to any disclaimer, the term of this patent is extended or adjusted under 35 U.S.C. 154(b) by 277 days.

(21) Appl. No.: 14/054,062

(22) Filed: Oct. 15, 2013

(65) Prior Publication Data

US 2014/0106316 A1 Apr. 17, 2014

Related U.S. Application Data

(60) Provisional application No. 61/713,730, filed on Oct. 15, 2012.

(51) Int. Cl.
*G09B 23/02* (2006.01)

(52) U.S. Cl.
CPC ..................... *G09B 23/02* (2013.01)

(58) Field of Classification Search
CPC .................................................... G09B 23/02
USPC ......................................................... 434/188
See application file for complete search history.

(56) References Cited

U.S. PATENT DOCUMENTS

| | | | |
|---|---|---|---|
| 1,415,278 A | 5/1922 | Tod | |
| 2,402,892 A | 6/1946 | Hubble | |
| 3,212,202 A | 10/1965 | Heinichen | |
| 3,339,291 A | 9/1967 | Ruchlis | |
| 3,424,455 A | 1/1969 | Dunson | |
| 3,486,244 A | 12/1969 | Horn | |
| 3,567,221 A | 3/1971 | Stults | |
| 3,613,268 A | 10/1971 | Fowler | |
| 3,928,923 A | 12/1975 | Harte | |
| 3,949,491 A | 4/1976 | Harte | |
| 4,106,220 A | 8/1978 | Hurd | |
| 4,638,999 A | 1/1987 | Keska | |
| 4,731,022 A | 3/1988 | Garland | |
| D392,200 S | 3/1998 | Gibson et al. | |
| 5,951,406 A * | 9/1999 | Steane | A63G 11/00 434/194 |
| D611,375 S | 3/2010 | Lin | |

* cited by examiner

*Primary Examiner* — Robert P Bullington
(74) *Attorney, Agent, or Firm* — Hoffman & Baron, LLP

(57) ABSTRACT

A teaching device used for teaching mathematical operations that includes: a support defining a fulcrum axis, a lever-like member, a plurality of objects and optionally a cradle. The lever-like member is pivotably supported about the fulcrum axis and has a surface facing upwardly with a plurality of weight stations equidistantly disposed along the length at measured intervals that are assigned numeric values. Each of the objects has a weight that is assigned a numerical value. One or more of the objects can be positioned on the weight stations on each of the first and second ends of the lever-like member. The moments for the first and second ends about the fulcrum are the sum of the products of the weight value and distance from the fulcrum axis for each weight. The lever-like member is in equilibrium when the first moment is equal to the second moment.

6 Claims, 12 Drawing Sheets

MULTIPLE MATHEMATICAL OPERATION TEACHING DEVICE

This application claims priority based on U.S. provisional application No. 61/713,730, filed on Oct. 15, 2012.

BACKGROUND OF THE INVENTION

The present invention relates generally to systems that facilitate learning, and more particularly to a system including a device and method that enable a beginner to more readily learn multiple mathematical principles utilizing the device.

A lever is a rigid object that is used with an appropriate fulcrum or pivot point to multiply the mechanical force (effort) that can be applied to another object (load). Archimedes, a Greek mathematician, physicist, engineer, inventor, and astronomer, purportedly said: "Give me a lever long enough and a fulcrum on which to place it, and I shall move the world." Archimedes explained the principal of how a lever works and formulated the law of the lever, which states that two objects placed on a lever will be in equilibrium when the product of the distance from the fulcrum and the weight of the first object is equal to the product of the distance from the fulcrum and the weight of the second object. This is expressed in the mathematical equation $d_1 W_1 = d_2 W_2$, where $d_1$ and $d_2$ are the distances from the fulcrum and $W_1$ and $W_2$ are the weights of the objects.

Archimedes proved the law of the lever, starting with three assumptions:

1. Equal weights at equal distances from the fulcrum balance. Equal weights at unequal distance from the fulcrum do not balance, but the weight at the greater distance will tilt its end of the lever down.

2. If, when two weights balance, an additional weight is added to one of the weights, the two weights no longer balance. The side holding the weight that was increased goes down.

3. If, when two weights balance, some of the weight is taken away from one of the weights, the two weights no longer balance. The side holding the weight at was not changed goes down.

The fulcrum is the support about which a lever pivots. An example of a fulcrum is the support for a see-saw that is positioned somewhere near the middle. The opposing ends of a see-saw go up and down as they pivot on the fulcrum. To successfully operate a see-saw, persons of approximately equal weight are positioned at approximately equal distances from the fulcrum. When two people of unequal weights use a see-saw, the heavier person is positioned closer to the fulcrum to create an equilibrium condition.

The present invention uses the law of levers to provide a mathematical teaching device that assists students in learning multiplication, division, addition and subtraction. The visual feedback provided by the lever allows students to immediately know if they have correctly positioned the weight to achieve equilibrium. By incorporating aspects of a game, the mathematical teaching device maintains the interest of students and improves their mathematical skills.

SUMMARY OF THE INVENTION

The device of the present invention helps teach multiple mathematical operations, such as multiplication, division, addition and subtraction. The teaching device includes a support defining a fulcrum axis, a lever-like member and a plurality of objects. The support includes two vertical members extending upwardly from a base to distal ends. The lever-like member is pivotably supported about the fulcrum axis and has a length extending between first and second ends and a width. The support can pivotably support the lever-like member at one or more adjustable pivot points on the lever-like member, which are located at different distances from the first end. The lever-like member also has a surface facing upwardly and a plurality of weight stations equidistantly disposed at a number of predetermined locations along the length. The lever-like member is adjustably positioned on the fulcrum axis to define the first and second ends of the lever-like member. The objects are placed on the weight stations at either end of the lever-like member. Each of the plurality of objects has a weight and one of the objects has a first weight unit and the weights of other objects are equal to whole number multiples of the first weight unit. Each of the objects can be assigned a numerical value equal to its weight unit value.

The first end of the lever-like member has a first moment about the fulcrum axis and the second end of the lever-like member has a second moment about the fulcrum axis. The lever-like member is in equilibrium when the first moment is equal to the second moment. One or more of the plurality of objects can be positioned on each of the first and second ends of the lever-like member so that the first moment is equal to the second moment.

In a preferred embodiment, a distance between the fulcrum axis and an adjoining weight station location and between any two adjoining weight station locations is equal to one length unit. Each of the weight stations is assigned a numerical value equal to its distance from the fulcrum axis as measured by the number of length units.

Typically, a first object is located on a first weight station on the first end of the lever-like member and a second object is located on a second weight station on the second end of the lever-like member. The lever-like member is in equilibrium when the product of the numerical value of the first weight station and the weight unit value of the first object is equal to the product of the numerical value of the second weight station and the weight unit value of the second object. In some cases, a plurality of first objects is located on a plurality of first weight stations on the first end of the lever-like member and a plurality of second objects is located on a plurality of second weight stations on the second end of the lever-like member. The lever-like member is in equilibrium when the sum of the products of the numerical value of each of the first weight stations and the weight unit value of each of the first objects is equal to the sum of the products of the numerical value of each of the second weight stations and the weight unit value of each of the second objects.

The weight stations can include a peg extending upwardly from the lever-like member and the objects can have an aperture adapted for receiving the peg. In another embodiment, each of the weight stations includes a notch in the lever-like member and the objects have a perimeter with three or more flat surfaces that are received by the notch. In still another embodiment, each of the weight stations includes a recessed area in the surface of the lever-like member that has a shape (round, square, triangular, etc.) that corresponds to the shape of the objects and is adapted for receiving the objects.

The teaching device can also include a cradle pivotably connected to the fulcrum axis and having an adjustable weight balance. The lever-like member is adjustably attached to the cradle so that the ends can be moved closer to and further away from the fulcrum axis. As one end is moved closer to the fulcrum axis, the other end is moved further away. The cradle can have a base with two opposing sides and two side walls extending upwardly from the opposing sides. The lever-like member is disposed on the base and between the opposing side walls. The adjustable weight balance is adjustably positioned in the base. Preferably, the adjustable weight balance is a metal rod that is adjustably positioned in an aperture in the base.

The preferred embodiments of the device and method of the present invention, as well as other objects, features and advantages of this invention, will be apparent from the following detailed description, which is to be read in conjunction with the accompanying drawings.

DETAILED DESCRIPTION OF THE PREFERRED EMBODIMENTS

Figure 1:
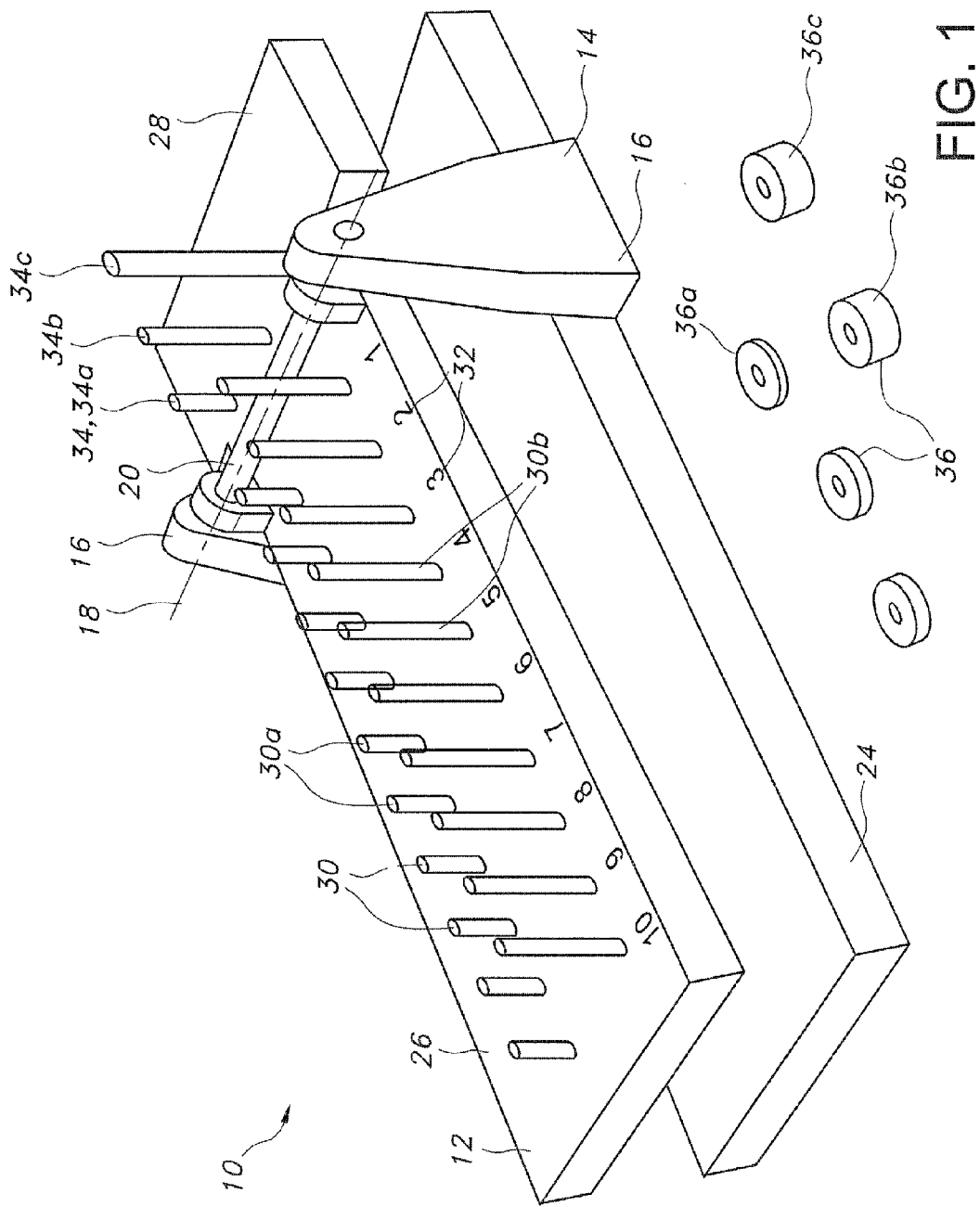
FIG. 1 is a top perspective view of the mathematical teaching device of the present invention.
Figure 2:
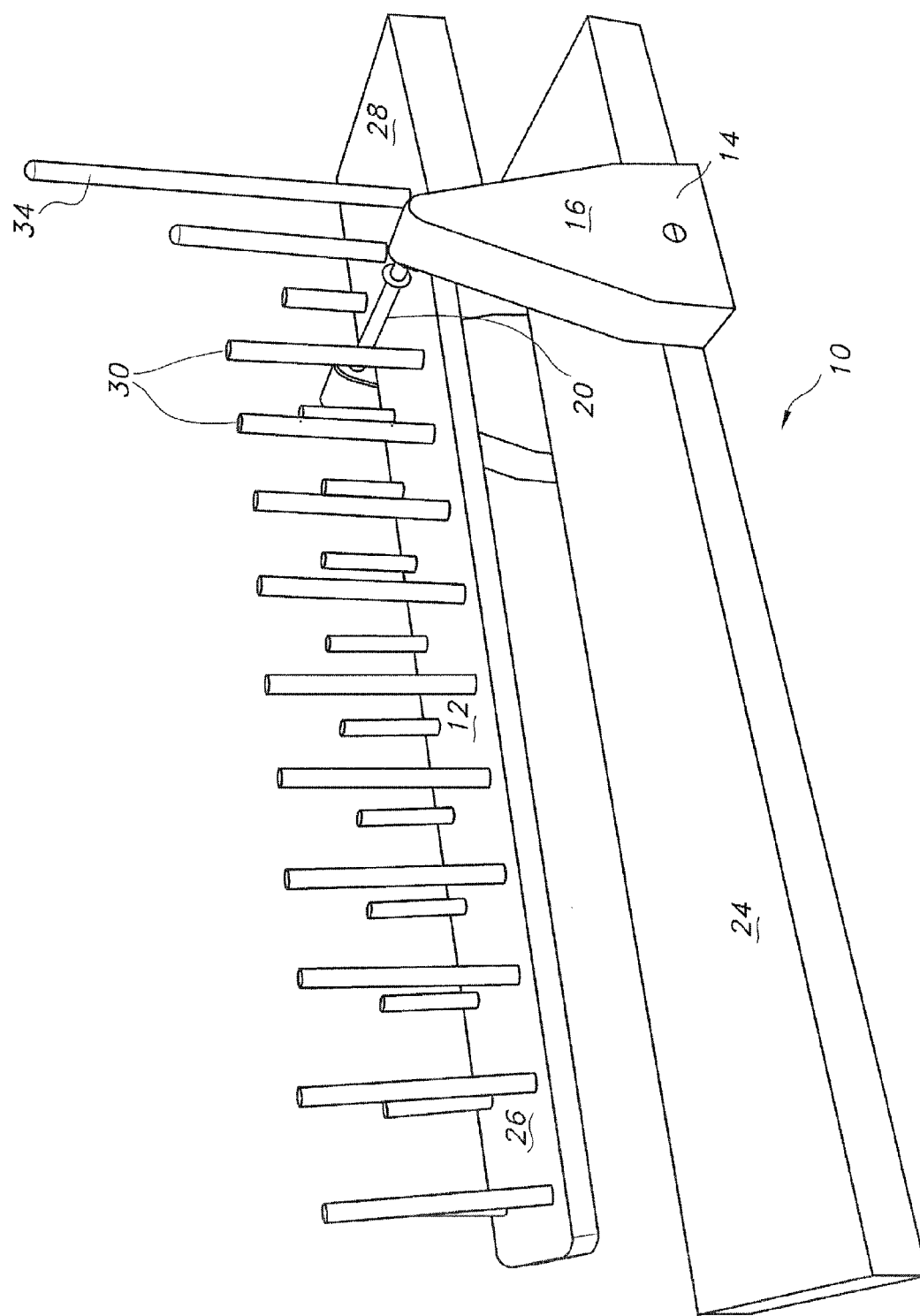
FIG. 2 is a top perspective view of the mathematical teaching device shown in FIG. 1.
Figure 3:
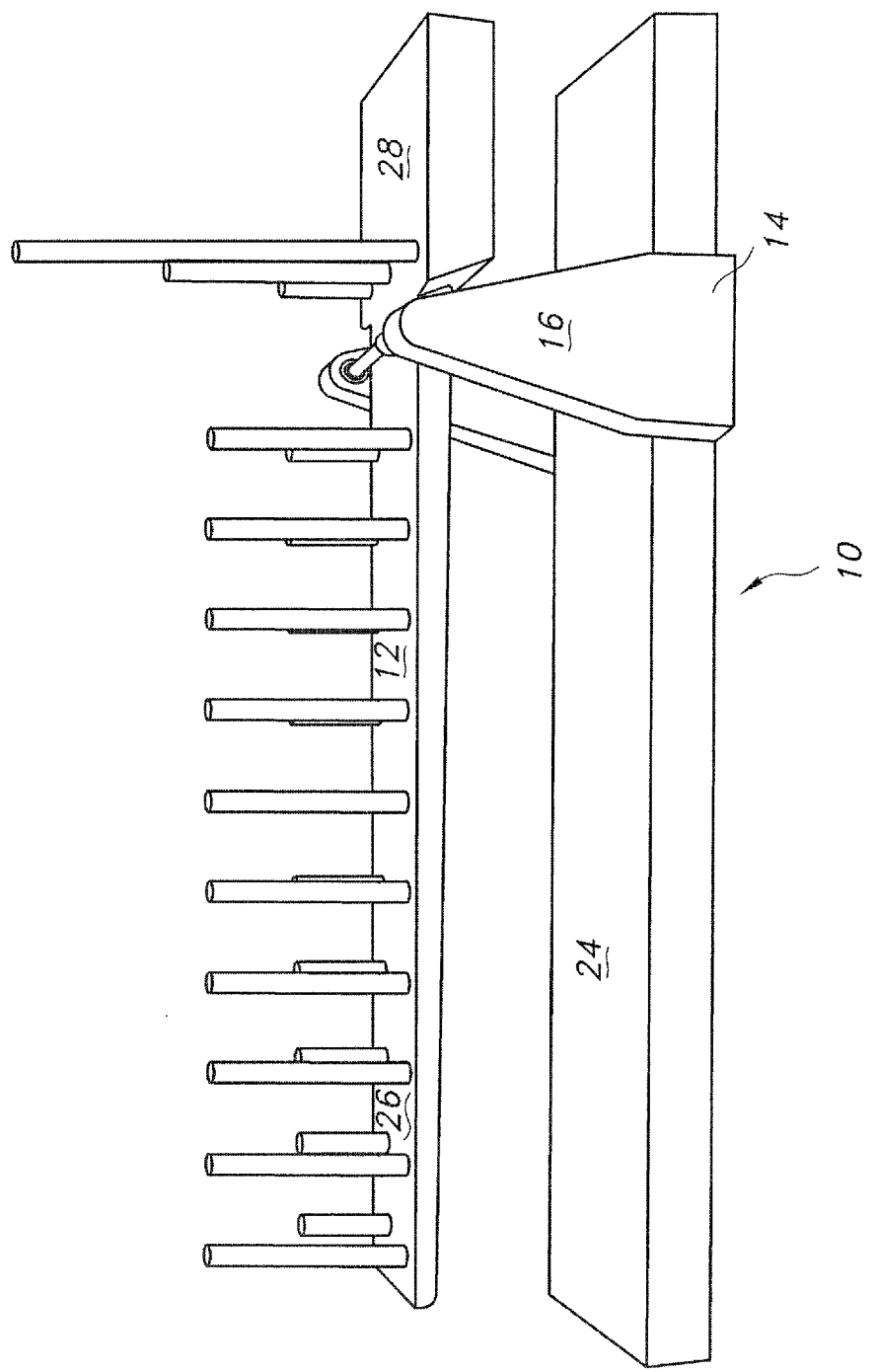
FIG. 3 is a side view of the mathematical teaching device shown in FIG. 1.
Figure 4:
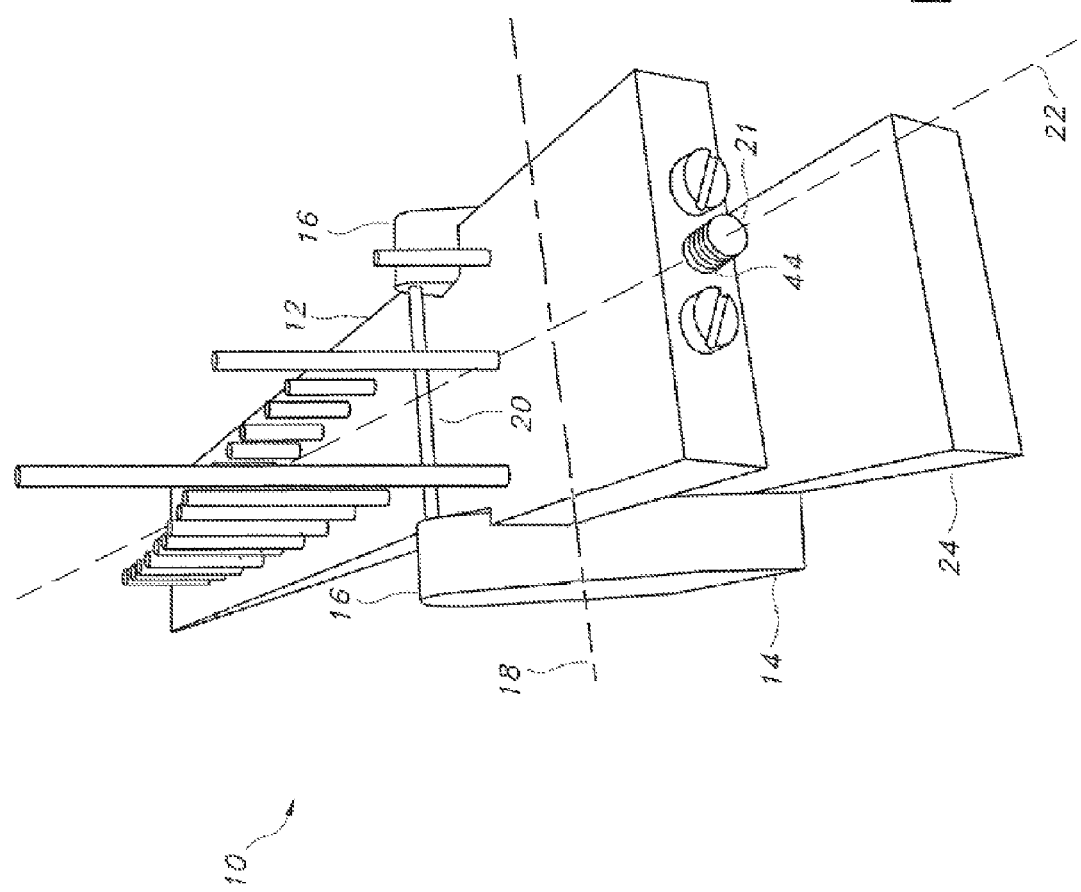
FIG. 4 is a rear view of the mathematical teaching device shown in FIG. 1.

The teaching device according to the present invention is generally in the form of a seesaw type device, termed a "mathematical seesaw." The device generally includes a support defining a fulcrum axis, a lever-like member pivotably supported about said fulcrum axis and a plurality of weights, wherein the lever-like member has a plurality of weight stations disposed at predetermined locations with respect to the fulcrum axis for placement of the weights.

In one embodiment, the device generally includes an elongated generally rectilinear plane supported to pivot or partially rotate about a transverse fulcrum axis similar to a seesaw. Unlike a typical seesaw, the mathematical seesaw of the present invention includes an elongated generally rectilinear lever-like member supported to pivot about a fulcrum axis spaced above or below and transverse to the longitudinal axis of the lever in a manner to create longer and shorter lever ends of predetermined length relative to the fulcrum axis.

The fulcrum axis is preferably supported by a base structure that maintains the fulcrum axis in a stable position during operation of the mathematical seesaw and defines two ends of the lever on opposing sides of the fulcrum axis. In a preferred embodiment, the fulcrum axis can be adjustably supported at a plurality of locations on the base structure. By adjusting the position of the fulcrum axis, long and short ends of the lever can be formed. When the position of the fulcrum axis is located at the mid-point of the lever, the lever will be disposed in a horizontal static equilibrium position when free of any external forces acting on the lever.

The ends of the lever include locations for positioning one or more objects of predetermined, identifiable weight at a plurality of equally spaced positions or stations formed along the longitudinal axis of the lever (plane). The positions or stations can be identified by indicia, preferably numerals (e.g., 1, 2, 3 . . . ), corresponding to the stations, which indicate by unit measurements the distance of each station from the fulcrum axis. For example, the station on the longer lever end closest to the fulcrum axis would be spaced a single arbitrary unit of measurement, e.g. an inch, from the fulcrum axis. The remaining stations on the long end of the lever would be equally spaced from one another and spaced from the fulcrum axis by progressively increasing multiples of the arbitrary unit of measurement.

The shorter end of the lever includes one or more stations on its upper surface spaced at distances similar to the spacing of the stations on the longer end. When a single weight receiving station on the shorter lever end is used, the weight supported at the single station is sufficient to offset or counterbalance a weight positioned on a selected station on the longer end of the lever so as to maintain the lever in a horizontal equilibrium position.

In another embodiment, the fulcrum of the lever-like member is moved to the center of the member. In this embodiment, the device includes an elongated generally rectilinear lever-like member supported by a support frame, wherein the support frame defines a fulcrum axis that is fixed mid-way along the length of the lever-like member, with respect to its longitudinal axis, so as to create opposite ends of the lever-like member having equal length.

In still another embodiment of the present invention, the fulcrum of the lever-like member can be adapted to be adjustable with respect to the lever. In this embodiment, the device similarly includes an elongated generally rectilinear lever-like member supported by a support frame. However, in this embodiment, the device includes a cradle portion, which is movably connected to the lever member so that the length of each end of the lever member can be adjusted with respect to the fulcrum axis. The cradle portion preferably includes two cradle plates supported by the support frame, wherein each cradle plate includes a slide groove for retaining the lever member in a slidable fashion. In this manner, the lever member is held in place by the cradle plates, but the lever member can be longitudinally moved with respect to the cradle plates in order to adjust the length of the lever plate extending in each direction from the fulcrum axis.

In each of these embodiments, the device includes means for enabling the positioning of an object of predetermined identifiable weight at a selected one of a number of equally spaced positions or stations formed longitudinally along each end of the lever device. In preferred embodiments, such means can take the form of pegs, or such means can include a plurality of grooves. Also, the device according to each embodiment further includes a plurality of weights to be positioned on the lever at desired stations.

As used herein, the term "lever" (also referred to interchangeably as lever-like member and lever member) refers to a rigid rod or bar to which a force may be applied to overcome a resistance. The lever is free to turn about a fixed support or pivot point called the fulcrum to multiply the force applied to another object. A lever is a simple machine used to gain force, gain speed, or change direction.

As used herein, the term "fulcrum axis" (also referred to interchangeably as the fulcrum) refers to the fixed support about which the lever moves. The lever balances on the fulcrum axis and the lever is in equilibrium (or balanced) when the moments on either side are equal.

As used herein, the term "support point" for the lever refers to locations on the lever that can be pivotably attached to the fulcrum axis. The support points are located along the length of the lever at different distances from the midpoint of the lever. This allows the position of the lever with respect to the fulcrum axis to be adjusted so that one end of the lever is further away from the fulcrum axis than the second end.

As used herein, the term "moment" refers to the force attempting to produce motion around the fulcrum axis. For the lever, the moment is the force generated by a weight at a distance from the fulcrum axis. The moment increases as the distance from the fulcrum increases and/or as the weight placed on the lever increases. The moment decreases as the distance from the fulcrum decreases and/or as the weight placed on the lever decreases. A balance or equilibrium is achieved when the moment of the lever on one side of the fulcrum axis equals the moment of the lever on the other side of the fulcrum axis.

As used herein, the term "adjustable weight balance" refers to a weight that is adjustably attached to the cradle. When the lever is adjusted so that one end is a greater distance from the fulcrum axis than the other end, the adjustable weight balance is repositioned towards the short end of the lever-like member to compensate for the greater moment of the longer end. The adjustable weight balance is moved away from the fulcrum axis until the lever-like member is in equilibrium.

Referring to FIGS. 1-4, a device for facilitating learning multiple mathematical operations is indicated generally at 10. The learning device 10, which may alternatively be referred to as a mathematical seesaw, includes an elongated generally rectilinear lever-like member 12 supported by a support frame, indicated generally at 14. The support frame 14 includes a pair of parallel upstanding support members 16 adapted to support the lever-like member 12 for rotation or pivotal movement about a fulcrum axis 18 defined by a cylindrical shaft or rod 20. The fulcrum shaft 20 is in turn supported by and between upper ends of the support members 16 so as to lie in a plane normal to the support members 16 and transverse to the longitudinal axis 22 of the lever 12 when disposed in a horizontal position. A threaded metal rod 21 is positioned in an aperture 44 that extends along the longitudinal axis 22 of the lever 12 and acts as an adjustable weight balance for adjusting the equilibrium of the lever 12. The support members 16 are secured at their lower ends to opposite side edges of a base plate 24 to provide a support base for supporting the lever 12.

The fulcrum axis 18 extends transverse to the longitudinal axis 22 of the lever 12 and can be positioned above or below the plane of the lever-like member 12. The lever 12 can be supported by the support frame 14 to pivot about the fulcrum axis 18 in a manner to create a longer lever end 26 and a shorter lever end 28 of the lever. The longer lever end 26 and the shorter lever end 28 have lengths that are determined by the distance from the fulcrum axis 18.

When the longer lever end 26 and the shorter lever end 28 of the lever 12 are formed, an adjustable weight balance 121 (FIG. 9) is used to adjust the moment of the short end 28 so that the lever is in a horizontal static equilibrium position when free of any external forces acting on the lever 12. The lever-like member 12 and associated support structure can include means adapted for interaction to prevent the lever 12 from rotating or pivoting downwardly or upwardly beyond pre-established limits.

The longer end 26 of the lever 12 includes means to enable positioning of an object 36 of predetermined identifiable weight at one of a number of equally spaced positions or stations formed longitudinally along the longer end 26 of the lever 12. Such means may include a plurality of pegs 30 fixed to the upper surface of the lever 12 at predetermined locations. The pegs 30 preferably extend vertically from the horizontal plane of the lever 12 and are preferably spaced at equidistant intervals from the fulcrum axis 18.

To further enhance understanding of mathematical concepts, pegs 30 of different lengths can be provided on the upper surface of the lever 12. For example, FIGS. 1-4 show a first column of pegs 30a having a first length and a second column of pegs 30b having a second length, wherein the first length is smaller than the second length. In this manner, the first column of pegs 30a having the shorter length can represent the ones unit, while the second column of pegs 30b can represent the fives unit, as will be discussed in further detail below.

The position of each peg 30 or station is preferably identified by a visible progressively increasing numerical representation 32 on the lever 12 that corresponds to the distance of the station from the fulcrum axis 18. For example, the station on the longer lever end 26 closest to the fulcrum axis 18 would be spaced a single arbitrary unit of measurement, e.g. an inch, from the fulcrum axis, and would be represented by the numerical value "1". The remaining stations on the long end 26 of the lever 12 would be equally spaced from one another and spaced from the fulcrum axis 18 by progressively increasing multiples of the arbitrary unit of measurement and be represented by corresponding numerals.

The shorter end 28 of the lever 12 includes a single station on its upper surface spaced a distance from the fulcrum axis 18 equal to the spacing of the station on the longer end 26 that is closest to the fulcrum axis 18. Here too, the single station means may take the form of one or more pegs 34 fixed to the upper surface of the shorter end 28 of the lever 12, which extend vertically from the horizontal plane of the lever 12. These pegs 34 may also be provided with varied lengths to represent different weight units, e.g., "ones," "fives" and "tens." As will be discussed in further detail below, the single weight receiving station on the shorter lever end 28 enables a weight to be supported at the single station sufficient to offset or counterbalance a weight positioned on a selected one of the stations on the longer end 26 of the lever 12 so as to maintain the lever 12 in a horizontal equilibrium position.

The teaching device 10 of the present invention is further provided with a plurality of weights 36 to be positioned on the lever 12 at desired stations. The weights 36 are preferably of a form meant to complement the structural form of the stations on the lever 12. For example, where cylindrical pegs 30, 34 are provided on the lever 12, the weights 36 are preferably in the form of relatively small light weight circular discs or rings having an aperture with an inner diameter sized to receive the outer diameter of the pegs 30, 34. Of course, any other shape of equal unit weight can be used individually or in stacked combination to create a desired gross weight value.

It will also be understood that weights of alternative configurations and of greater unit weight can also be used either individually or in combination with lesser weight discs to create a desired gross weight value. For example, the device 10 can be provided with weights 36 including a plurality of 1 gram rings 36a, a plurality of 5 gram rings 36b and a plurality of 10 gram rings 36c.

It will also be understood that in all the embodiments described herein, the term weight is defined as including a single or plurality of relatively small light weight circular discs or rings or any other shape of equal unit weight that can be used individually or in stacked combination to create a desired gross weight value. It will be understood that weights of alternative configurations and of greater unit weight can also be used either individually or in combination with the lesser weight discs to create a desired gross weight value.

In use, a child or adult learning multiplication, for example, can place an object of known weight, such as a single or combination of known unit weight discs 36, on the longer lever end 26 at a selected station thereon to cause the longer end 26 to incline downwardly. The amount of weight $W_2$ required to be placed on the shorter end 28 of the lever 12 is determined by the formula: $W_1 \times D_1$, where $W_1$ is the amount of weight placed on the longer end 26 of the lever 12 and $D_1$ is the distance from the fulcrum axis 18 where the weight is placed.

For example, if a child places a 5 gram weight on the peg of the longer end 26 of the lever 12 spaced 3 units from the fulcrum axis 18, a 15 gram weight will be required on the peg at the shorter end 28 of the lever 12. In this manner, the child must mentally multiply the known weight value placed on the selected station of the longer lever end 26 times the distance of the selected station from the fulcrum axis 18. Assuming, for example, that the child has mentally calculated the multiplication answer to be fifteen units, the child selects a weight of fifteen units to place on the receiving station on the short end 28 of the lever 12. In this manner, the lever will be balanced and move to a horizontal position verifying that the youngster's mental multiplication is correct. Division is the inverse operation of multiplication and works in a similar manner. Addition and subtraction can be learned by adding and removing weights from the two ends 26, 28 of the lever 12.

If the child's mental calculation was incorrect, the weight selected as equal to the incorrect mental calculation and placed on the receiving station on the short end 28 of the lever 12 would either cause the long end 26 of the lever 12 to remain inclined downwardly or to become upwardly inclined thereby indicating that the child's mental calculation was incorrect.

Figure 5:
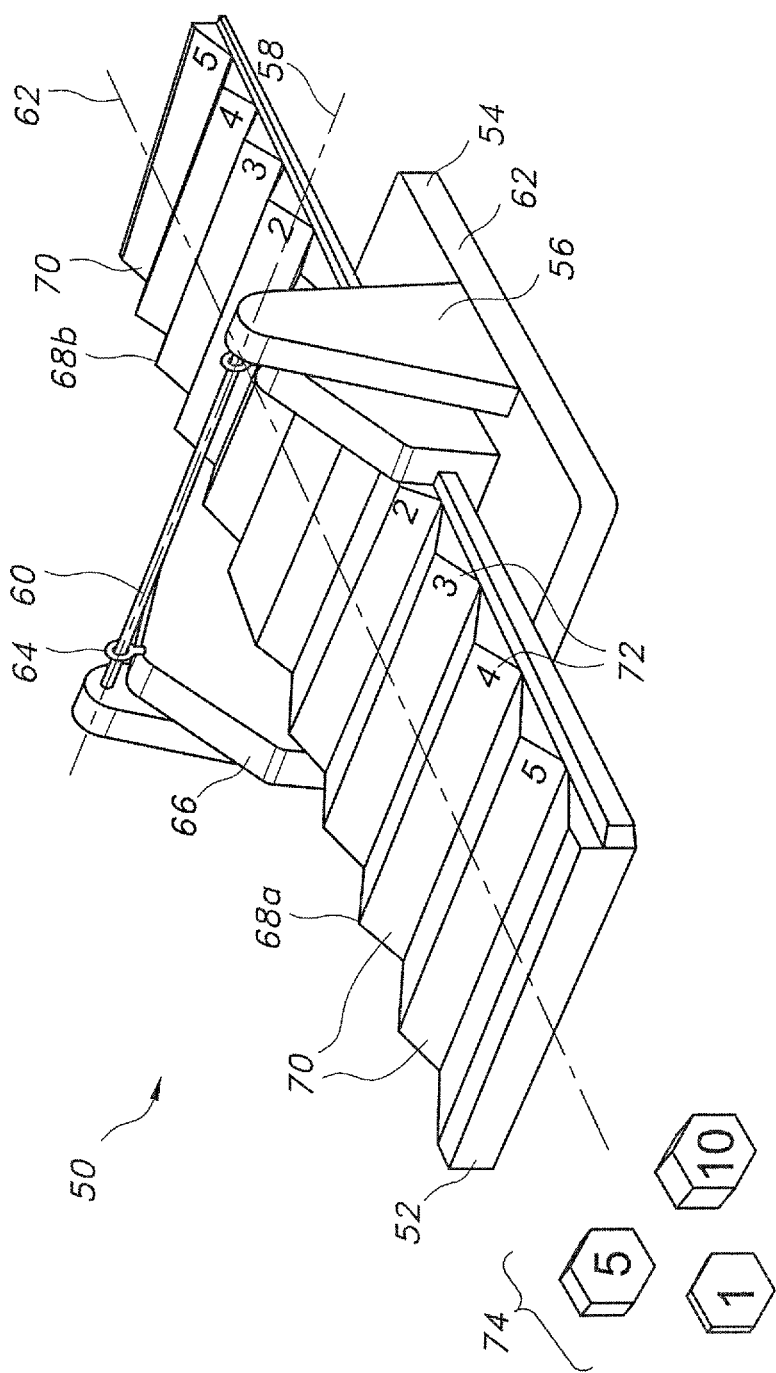
FIG. 5 is a top perspective view of a second embodiment of the mathematical teaching device of the present invention.

Referring now to FIG. 5, an alternative embodiment of a device for facilitating learning multiple mathematical operations is indicated generally at 50. In this embodiment, the fulcrum of the lever-like member has been moved to the center of the member and the pegs for accepting weights have been replaced by grooves.

More particularly, the learning device 50, according to this embodiment, similarly includes an elongated generally rectilinear lever-like member 52 supported by a support frame, indicated generally at 54. The support frame 54 includes a pair of parallel upstanding support members 56 adapted to support the lever 52 for rotation or pivotal movement about a fulcrum axis 58 defined by a cylindrical shaft or rod 60. The fulcrum shaft 60 is in turn supported by and between upper ends of the support members 56 so as to lie in a plane normal to the support members 56 and transverse to the longitudinal axis 62 of the lever 52 when disposed in a horizontal position. The support members 56 are secured at their lower ends to opposite side edges of a base plate 64 to provide a support base for supporting the lever 52.

The fulcrum axis 58 extends transverse to the longitudinal axis 62 of the lever 52 and, in this embodiment, is spaced above the plane of the lever-like member 52. Specifically, the lever-like member 52 hangs from the cylindrical shaft 60 via two eye-hooks 64 fixed to a cradle portion 66 of the lever-like member 52. In the embodiment shown in FIG. 5, the cradle portion 66 is disposed mid-way along the length of the lever-like member 52, with respect to its longitudinal axis 62, so as to create opposite ends of the lever-like member 52 having equal length. However, it is conceivable for the cradle portion 66 to be disposed at other locations along the length of the lever-like member 52 so as to create a longer lever end and a shorter lever end, as discussed above with respect to the embodiment shown in FIGS. 1-4.

When disposed in the center of the lever-like member 52, the cradle portion 66 supports the lever 52 to pivot about the fulcrum axis 58 in a manner to create two lever ends 68a, 68b of equal length. Each of the lever ends 68a, 68b has a predetermined length relative the fulcrum axis 18, wherein the lever will be disposed in a horizontal static equilibrium position when free of any external forces acting on the lever 52. The lever member 52 and associated support structure can include means adapted for interaction to prevent the lever 52 from rotating or pivoting downwardly or upwardly beyond pre-established limits.

Again, each lever end 68a, 68b includes means to enable positioning of an object of predetermined identifiable weight at a selected one of a number of equally spaced positions or stations formed longitudinally along each end of the lever 52. In this embodiment, such means include a plurality of grooves 70 formed horizontally in the lever 52 with respect to the longitudinal axis 62. In the embodiment shown in FIG. 5, the grooves 70 have a triangular, or v-shaped, cross-section. However, other cross-sectional shapes, such as semi-circular, rectangular, etc., are conceivable. In any case, the grooves 70 are preferably spaced at equidistant intervals from the fulcrum axis 58.

The position of each groove 70 is again preferably identified by a visible progressively increasing numerical representation 72 that corresponds to the distance of the station from the fulcrum axis 58. For example, the groove 70 on each end 68a, 68b closest to the fulcrum axis 58 would be spaced a single arbitrary unit of measurement for distance, e.g. an inch, from the fulcrum axis 58, and would be represented by the numerical value "1." The remaining grooves on each end of the lever 52 would be equally spaced from one another and spaced from the fulcrum axis 58 by progressively increasing multiples of the arbitrary unit of measurement and be represented by corresponding numerals.

The teaching device 50 of this embodiment is also provided with a plurality of weights 74 to be positioned on the lever 52 at desired stations. The weights 74 are preferably configured with a shape that complements the cross-section of the grooves 70 on the lever 52 so that they will not move when the lever 52 inclines. For example, where v-shaped grooves 70 are formed in the lever 52, the weights 74 preferably have a triangular or hexagonal shape, as shown in FIG. 5. If the grooves are semi-circular or rectangular, respectively circular or rectangular shaped weights can be provided so that, in each case, the weight can be securely received within each groove 70.

The weights 74 can also be used individually or in stacked combination to create a desired gross weight value. For example, the device 50 can be provided with weights 74 including a plurality of 1 gram discs, a plurality of 5 gram discs and a plurality of 10 gram discs.

Figure 6:
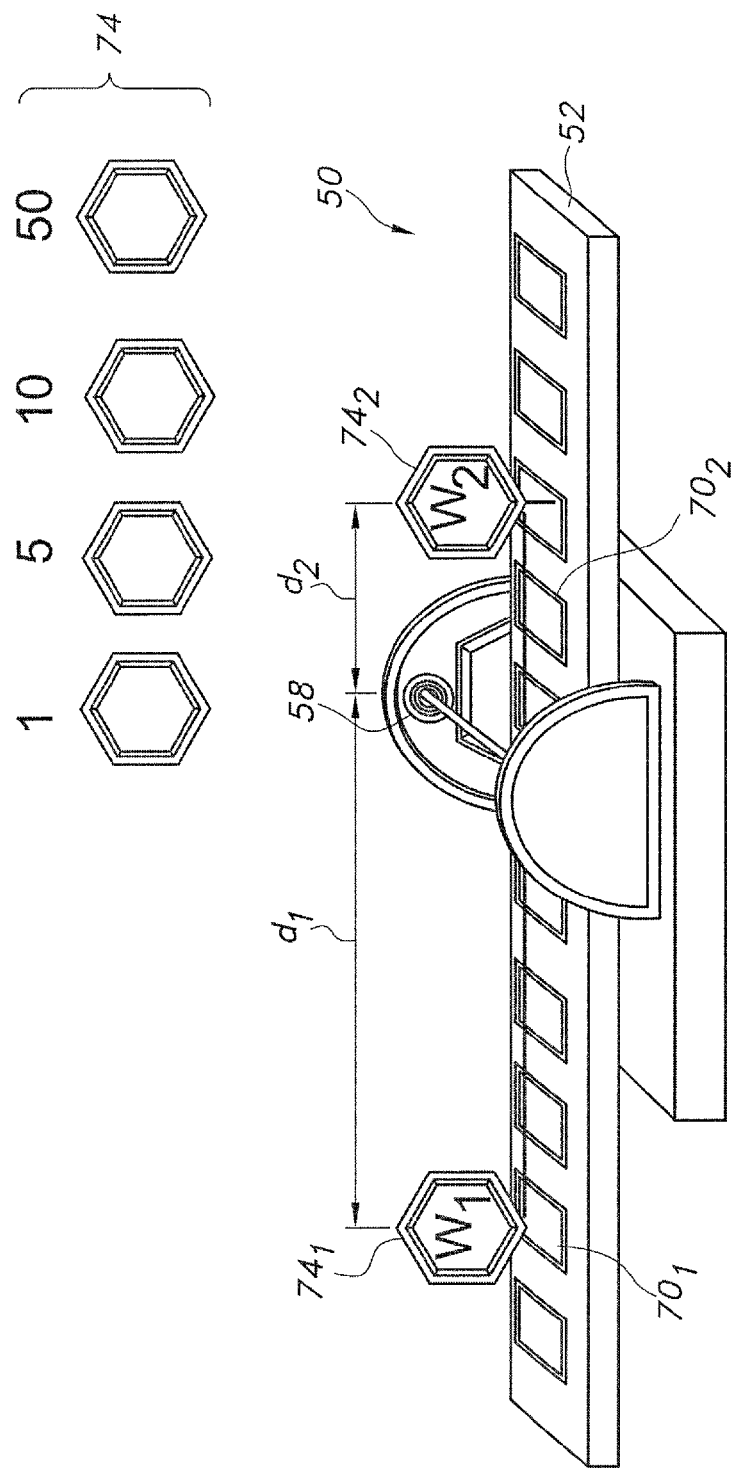
FIG. 6 is a schematic representation of the device shown in FIG. 5 illustrating the multiplication formula used to determine the selection of weight amount and placement.

Use of the device 50 according to this embodiment is similar to that described above. Specifically, a child or adult learning multiplication, for example, can place an object of known weight, such as a single or combination of known unit weight disc 74 in one of the grooves 70 on one end of the lever 52 to thereby cause this end to incline downwardly. The amount of weight $W_2$ required to be placed on the opposite end of the lever 52 is determined by the formula: $W_1 \times D_1 = W_2 \times D_2$, where $W_1$ is the amount of weight placed on one end of the lever 52 and $D_1$ is the distance from the fulcrum axis 58 where the first weight is placed, and $W_2$ is the amount of weight placed on the opposite end of the lever and $D_2$ is the distance from the fulcrum axis 58 where the second weight is placed. This formula is schematically shown with respect to the device 50 in FIG. 6.

For example, if a child places a 5 gram weight in the groove marked "4" on the lever 52, a 10 gram weight will be required in the groove marked "2" on the opposite end of the lever 52. In this manner, the child must mentally multiply the known weight value placed in the selected groove times the distance of the selected groove from the fulcrum axis 58 and then determine two multiple factors to be placed on the opposite end of the lever 52 in order to balance the lever 52.

Figure 7:
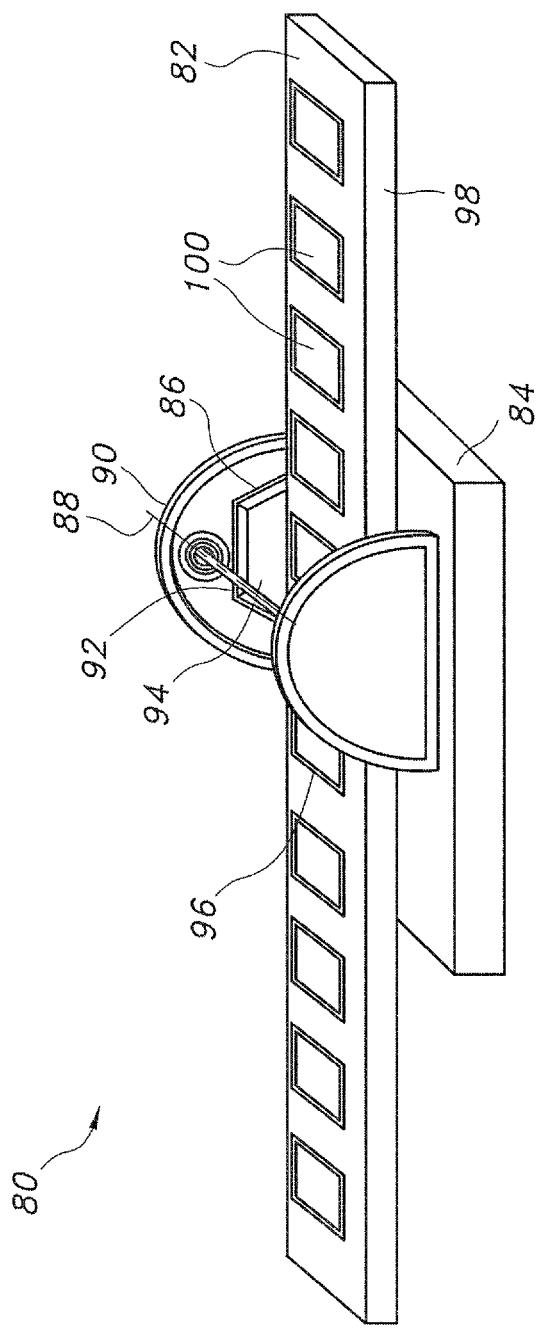
FIG. 7 is a schematic perspective view of a third embodiment of the mathematical teaching device of the present invention shown in a first position.
Figure 8:
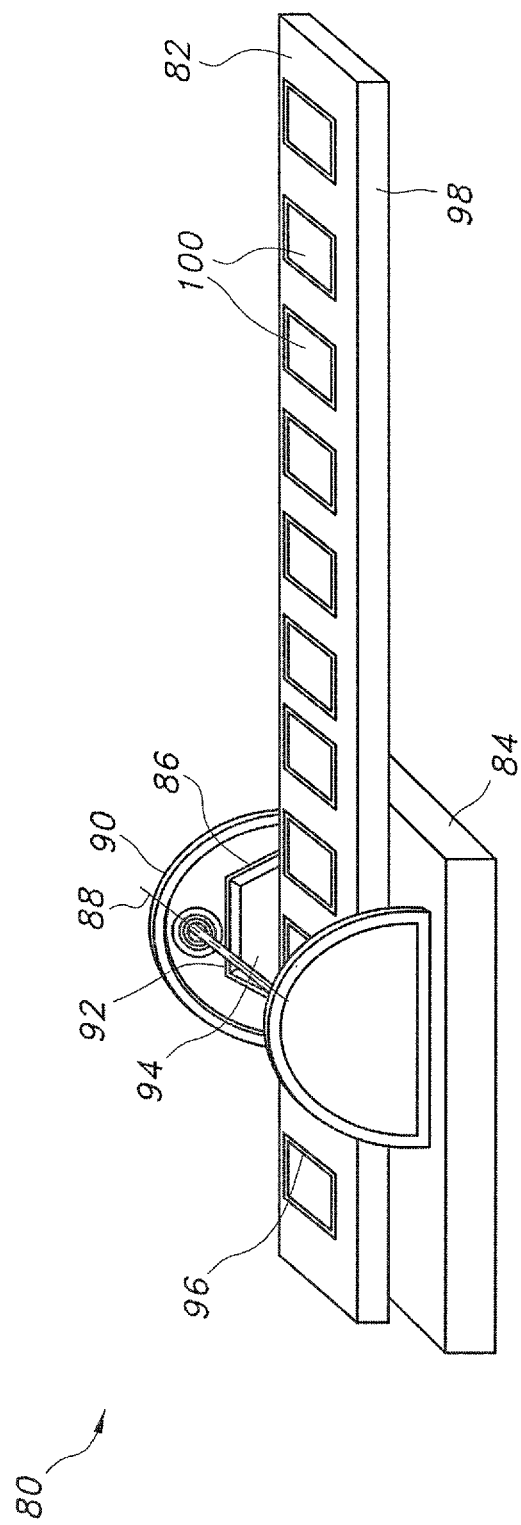
FIG. 8 is a schematic perspective view of the device shown in FIG. 7 shown in a second position.

FIGS. 7 and 8 show still another embodiment of a device 80 for facilitating learning multiple mathematical operations. Generally, in this embodiment, the fulcrum axis 88 of the lever-like member 82 is adjustable with respect to the lever 82.

According to this embodiment, the device 80 similarly includes an elongated generally rectilinear lever-like member 82 supported by a support frame, indicated generally as 84. The support frame 84 includes a pair of parallel upstanding support members 86 adapted to support the lever 82 for rotation or pivotal movement about a fulcrum axis 88 defined by a cylindrical shaft or rod 90. The fulcrum shaft 90 can in turn be supported by and between upper ends of the support members 86 as described above with reference to FIG. 5.

However, in this embodiment, the device 80 includes a cradle portion 92, which is movably connected to the lever member 82 so that the length of each end of the lever member 82 can be adjusted with respect to the fulcrum axis 88. More specifically, the cradle portion 92 includes two cradle plates 94, which can be made to hang from the cylindrical shaft 90 via two eye-hooks, as described above, so that the cradle plates 94 face each other. For added stability, the cradle plates 94 can be connected to each other with a cross support.

Each cradle plate 94 is formed with a slide groove 96 having a width sufficient to accommodate the thickness of the lever member 82 and a depth sufficient to securely hold a lateral edge of the lever member 82. The slide grooves 96 of each cradle plate 94 face each other to define a parallel plane with respect to the fulcrum axis 88. The lever member 82 is slidably received within the slide grooves 96 of the cradle plates 94 and is thereby supported in the plane defined by the grooves 96.

In this manner, the lever member 82 is held in place by the cradle plates 94, but the lever member 82 can be longitudinally moved with respect to the cradle plates 94 in order to adjust the length of the lever plate 82 extending in each direction from the fulcrum axis 88. Adjustment of the lever member 82 takes place by sliding the lever member 82 within the slide grooves of the cradle plate 94. To minimize wear of the lever member 82 and the grooves 96 of the cradle plates 94, the lateral sides of the lever member 82 can be provided with wear strips 98 made from a low-friction material, such as Teflon®.

Thus, in FIG. 7, the cradle portion 92 is disposed mid-way along the length of the lever-like member 82, with respect to its longitudinal axis, so as to create opposite ends of the lever-like member 82 having equal length, while FIG. 8 shows the cradle portion 92 positioned toward one end of the lever member 82 so as to create a longer lever end and a shorter lever end. Again, this can be achieved by sliding the lever member 82 within the grooves 96 of the cradle plates 94 to position the cradle portion in a desired position.

The lever member 82 includes means 100 to enable positioning of an object of predetermined identifiable weight at a selected one of a number of equally spaced positions or stations formed longitudinally along each end of the lever 82. Such means can take the form of pegs, as described above and shown in FIG. 1-4, or such means can include a plurality of grooves, as described above and shown in FIGS. 5-6. Also, the device 80 according to this embodiment further includes a plurality of weights to be positioned on the lever 82 at desired stations 100.

Use of the device 80 shown in FIGS. 7 and 8 is similar to that described above, with the exception that the stations 100 are now adjustable with respect to the fulcrum axis 88. This means that a child or adult learning mathematical principles must be particularly attentive to the distance that each station 100 is located with respect to the fulcrum axis 88.

FIGS. 9-12 show another embodiment of the mathematical teaching device 110 having a lever member 112 adjustably positioned in a cradle 138 that is attached to a fulcrum axis 118. The fulcrum axis 118 is pivotably connected to a support frame 114 that includes a base plate 124 and two support members 116 that extend upwardly from the base plate 124 to distal ends 117. The opposing ends of the fulcrum axis 118 connect to the support members 116 near the distal ends 117. The lever member 112 has a first end 126, a second end 128 and a plurality of weight stations 130 on the upwardly facing surface. The weight stations 130 are preferably indentations in the lever member 112 that preferably correspond in shape (in this case diameter) to the weights 136 (see FIGS. 10 and 12) that are placed on the lever member 112.

Figure 9:
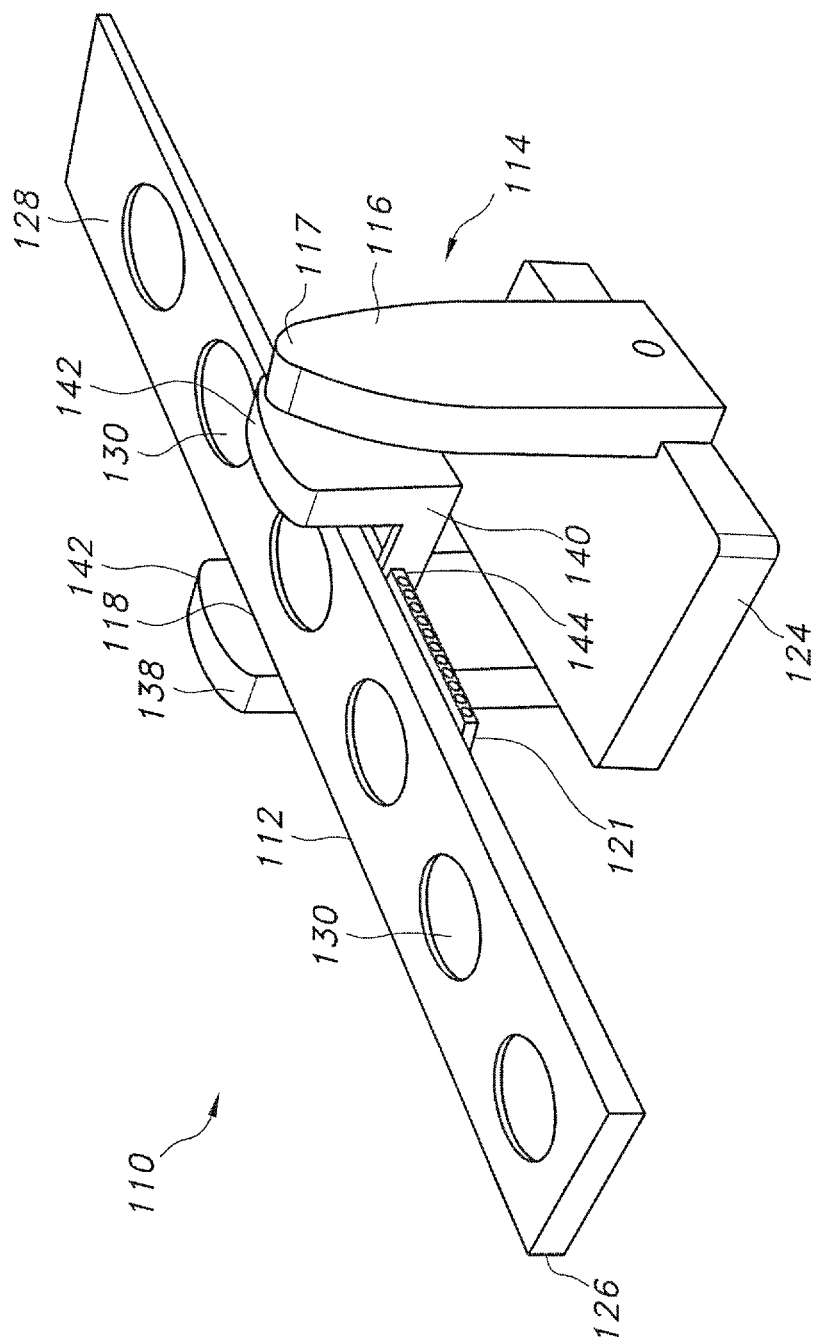
FIG. 9 is a perspective view of a fourth embodiment of the mathematical teaching device with the lever member centered on the fulcrum axis.
Figure 11:
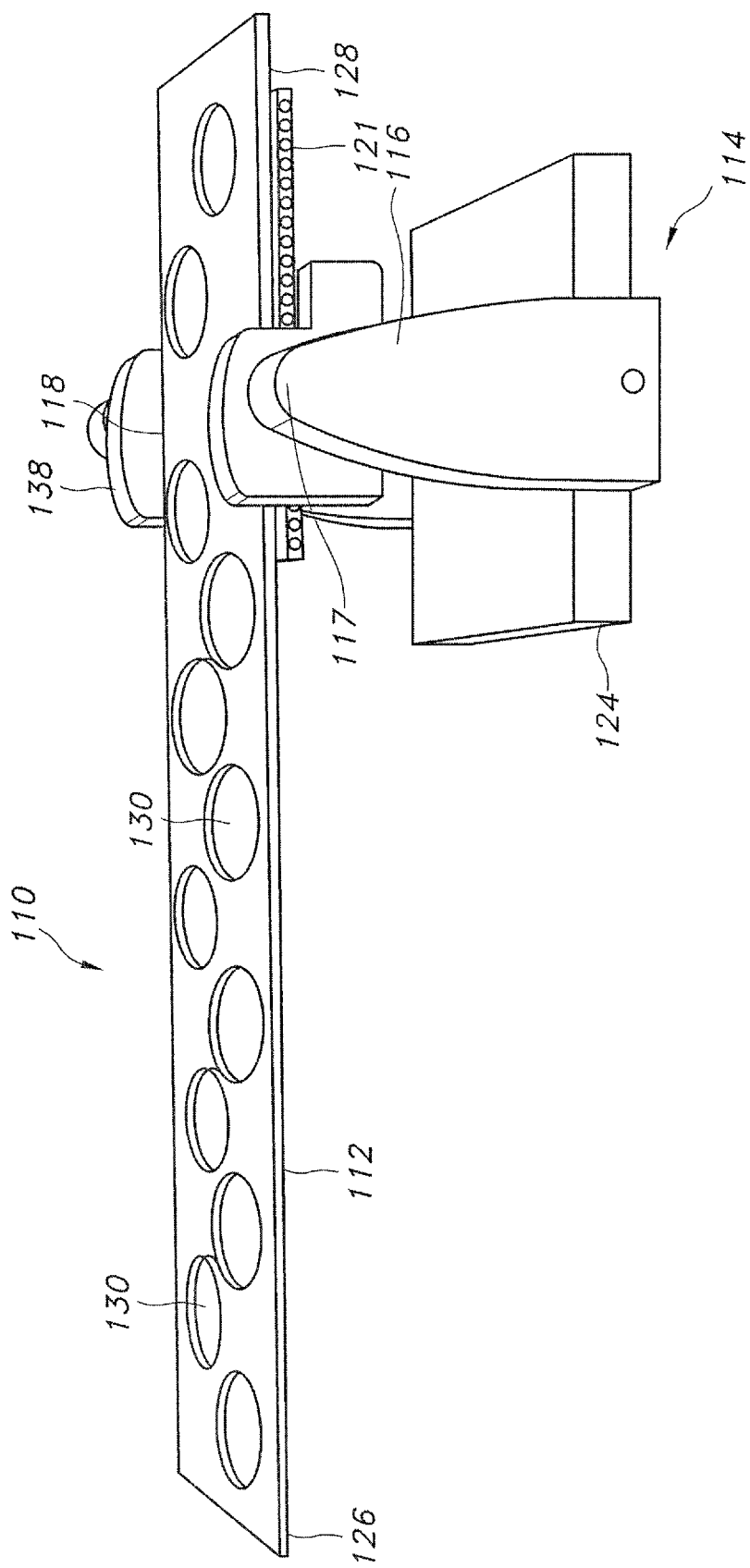
FIG. 11 is a side perspective view of the mathematical teaching device shown in FIG. 9 with the lever member positioned towards one en with respect to the fulcrum axis.

FIG. 9 shows the lever member 112 centered in the cradle 138. The cradle 138 is preferably U-shaped with a base 140 and two side walls 142 extending upwardly form the opposite sides of the base 140. An adjustable weight balance 121 is located in the base 140 of the cradle 138 and it is used to balance the device 110 so that it is in equilibrium when no objects are placed on the lever member 112. Preferably, the adjustable weight balance 121 can be a metal rod, preferably threaded, that is adjustably positioned in an aperture 144 in the base 140. FIG. 11 shows the lever member 112 offset from the fulcrum axis 118. In order for the device 110 to achieve equilibrium, the adjustable weight balance 121 is moved towards the second end 128 (i.e., the short end) of the device 110. Each time the position of the lever member 112 in the cradle 138 is adjusted, the adjustable weight balance 121 is used to balance the lever member 112 so that the device 110 is in equilibrium.

Figure 10:
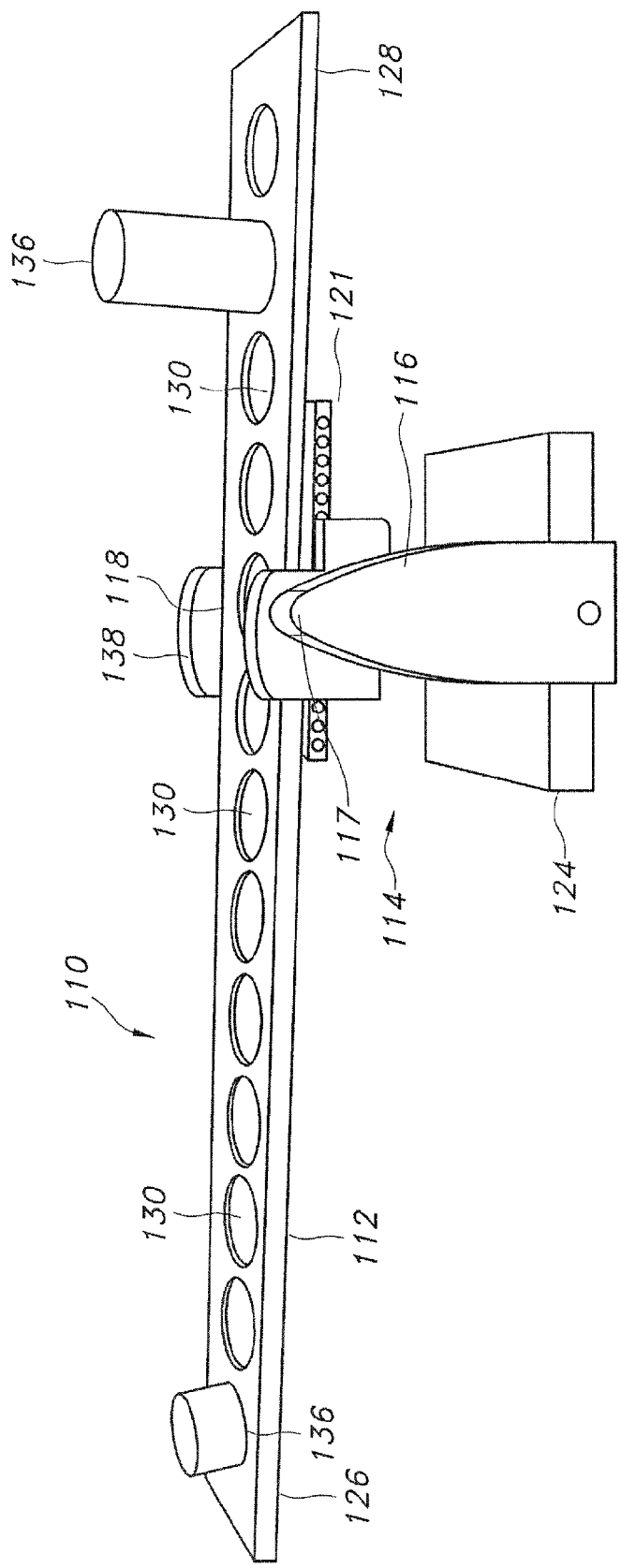
FIG. 10 is a side perspective view of the mathematical teaching device shown in FIG. 9 with objects balanced on the lever member.
Figure 12:
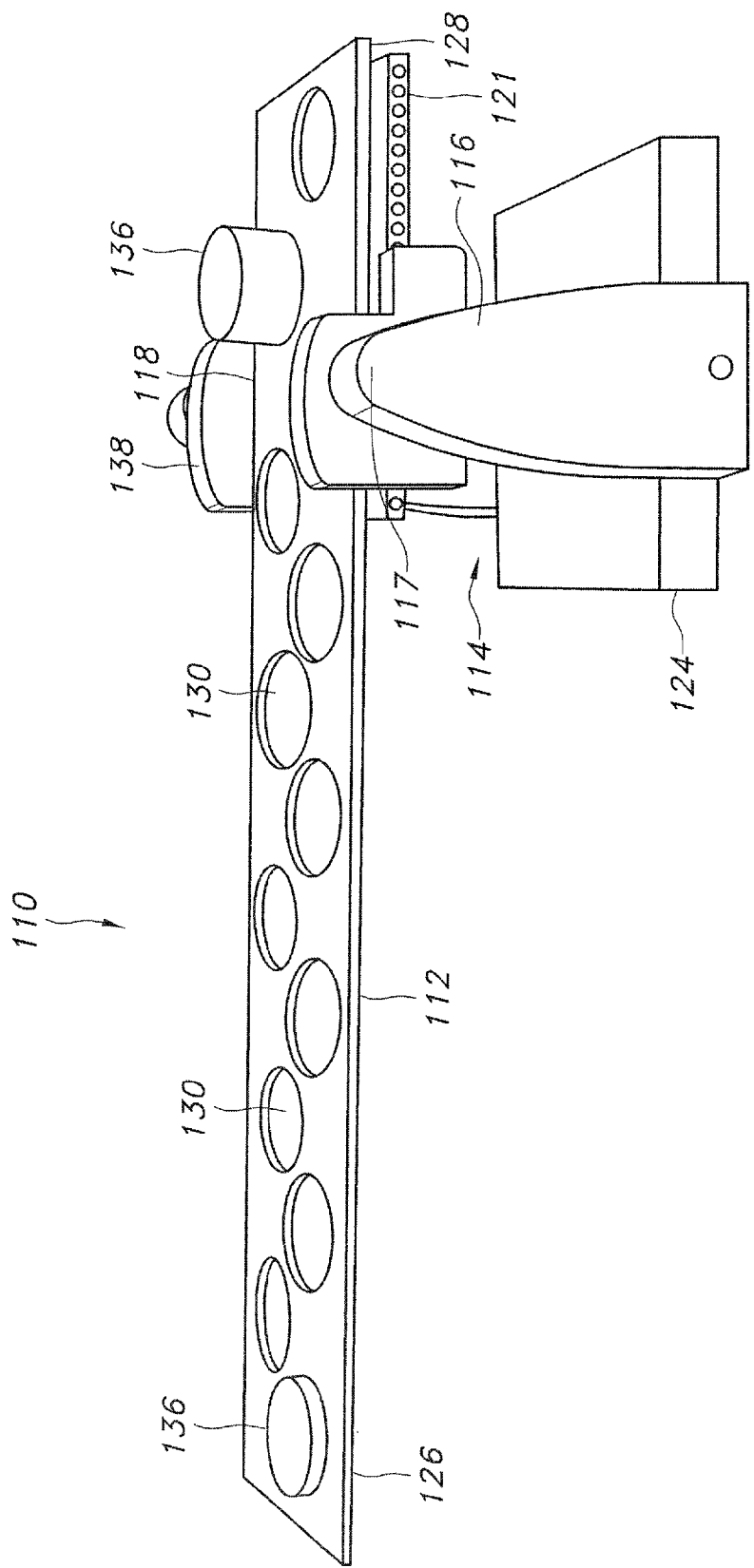
FIG. 12 is a side perspective view of the mathematical teaching device shown in FIG. 11 with objects balanced on the lever member.

FIGS. 10 and 12 show the device 110 with objects 130 placed on the lever member 12 weight stations 130 on either side of the fulcrum axis 118. The figures show that, in order for the device 110 to achieve equilibrium, fewer objects 130 can be placed on the first end 126 than on the second end 128, when the objects 130 on the first end 126 are further away from the fulcrum axis 118. As discussed above, the device achieves equilibrium or is balanced when the product of the weight of the objects 130 and the distance from the fulcrum axis 118 on one side of the fulcrum axis 118 equals the product of the weight of the objects 130 and the distance from the fulcrum axis 118 on the other side of the fulcrum axis 118.

Thus, it is seen that the mathematical seesaw of the present invention can be used to model multiple mathematical operations, such as multiplication, division, addition and subtraction. From an instructional standpoint, the manipulative system of the invention allows youngsters and students to use the tactile mode to learn the "Times Table" in the concrete through a real time method as opposed to memorizing it in the abstract. The learner can arrive at the correct answer to a multiplication problem through exploration and experimentation, the hallmark method of how a child learns from birth.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A teaching device for facilitating learning of multiple mathematical operations, such as multiplication, the device comprising:
   a support defining a fulcrum axis;
   a cradle pivotably connected to the fulcrum axis and comprising an adjustable weight balance;
   a lever-like member adjustably attached to the cradle, the lever-like member including a length, a width and a plurality of weight stations, wherein the fulcrum axis defines first and second ends of the lever-like member and wherein the lever-like member is adjusted in the cradle to move the ends closer to and further away from the fulcrum axis; and
   wherein the first end of the lever-like member has a first moment about the fulcrum axis and the second end of the lever-like member has a second moment about the fulcrum axis, and wherein the adjustable weight balance is positioned so that the first moment is equal to the second moment and the lever-like member is in equilibrium.

2. The teaching device according to claim 1, wherein the plurality of weight stations is equidistantly disposed at predetermined locations along the length of the lever member.

3. The teaching device according to claim 2, further comprising a plurality of objects for placement on the weight stations, wherein each of the plurality of objects has a weight and one of the objects has a first weight unit, and wherein the weights of other objects are equal to whole number multiples of the first weight unit and each object has a weight unit value.

4. The teaching device according to claim 1, wherein the cradle has a base with two opposing sides and two side walls extending upwardly from the opposing sides, wherein the lever-like member is disposed on the base and between the side walls, and wherein the adjustable weight balance is adjustably positioned in the base.

5. The teaching device according to claim 1, wherein the adjustable weight balance is a metal rod that is adjustably positioned in an aperture in the base.

6. The teaching device according to claim 1, wherein one or more first objects is located on one or more first weight stations on the first end of the lever-like member and one or more second objects is located on one or more second weight stations on the second end of the lever-like member, and wherein the lever-like member is in equilibrium when the sum of the products of the numerical value of each of the first weight stations and the weight unit value of each of the first objects is equal to the sum of the products of the numerical value of each of the second weight stations and the weight unit value of each of the second objects.

* * * * *